United States Patent [19]

Hirschkron

[11] Patent Number: 4,607,657

[45] Date of Patent: Aug. 26, 1986

[54] AIRCRAFT ENGINE INLET

[75] Inventor: Robert Hirschkron, Marblehead, Mass.

[73] Assignee: General Electric Company, Lynn, Mass.

[21] Appl. No.: 791,830

[22] Filed: Oct. 28, 1985

[51] Int. Cl.$^4$ .............................................. F02C 7/04
[52] U.S. Cl. .................................................. 137/15.1
[58] Field of Search ........................... 137/15.1, 15.2; 60/39.07, 39.092; 244/53 B

[56] References Cited

U.S. PATENT DOCUMENTS

| | | | |
|---|---|---|---|
| 2,396,598 | 3/1946 | Neumann | 137/15.1 X |
| 2,841,182 | 7/1958 | Scala | 138/37 |
| 2,848,155 | 8/1958 | Hausmann | 230/122 |
| 2,931,167 | 4/1960 | Leduc | 137/15.1 |
| 3,062,484 | 11/1962 | Himka | 244/53 B |
| 3,524,458 | 8/1970 | Goldsmith | 137/15.1 |
| 3,730,639 | 5/1973 | Moore et al. | 415/119 |

FOREIGN PATENT DOCUMENTS 907288 10/1962 United Kingdom .................. 244/53

Primary Examiner—Alan Cohan
Attorney, Agent, or Firm—Francis L. Conte; Derek P. Lawrence

[57] ABSTRACT

An air inlet for an aircraft engine is disclosed. The inlet includes a nacelle and a fairing spaced therefrom for defining an inlet duct to the engine. The fairing includes a plurality of inlet apertures in flow communication with ambient air and the nacelle includes at least one outlet aperture which is also in flow communication with ambient air. A plurality of struts extends between the fairing and the nacelle and a plurality of flow channels is provided therein, each extending in flow communication from respective ones of said inlet apertures through said struts and nacelle and to said outlet aperture. During operation, the air inlet receives air, and a portion thereof adjacent to the fairing is channeled through the inlet apertures and flow channels out the outlet aperture into the ambient air flowing over the nacelle to bleed off relatively low pressure recovery air.

10 Claims, 6 Drawing Figures

AIRCRAFT ENGINE INLET

BACKGROUND OF THE INVENTION

The present invention relates generally to air intakes for aircraft engines, and, more specifically, to an air intake including new and improved means for bleeding intake airflow flowing near a duct wall.

The present invention has utility, for example, in a turboprop gas turbine engine wherein a propeller blade row is disposed coaxially with a gas turbine engine. In this arrangement, the air inlet of the engine may be made fully annular and disposed downstream of the propellers.

A measure of performance of a propeller system is represented by pressure recovery to the inlet, which is defined as the local pressure immediately downstream of the propellers, which includes pressure rise due to the work performed thereby, divided by the total pressure of the inlet ambient air. Pressure recovery to the inlet characterizes the air being provided to the air intake of the engine and a value thereof of about 1.05 is considered good performance. The pressure recovery, of course, varies from the root to the tip of the propeller blades and has undesirably low values near the root of the propeller blades.

In conventional turboprop aircraft engines the propeller centerline is offset from the centerline of the engine and an offset air inlet is utilized. This inlet is disposed at a relatively large radial distance from the propeller hub and therefore does not ingest undesirable propeller hub airflow, which results in relatively low values of pressure recovery. However, when a fully annular air inlet is utilized, the undesirable propeller hub airflow must necessarily be channeled into the air inlet, thus reducing the maximum potential performance of the engine.

SUMMARY OF THE INVENTION

Acccordingly, one object of the present invention is to provide a new and improved air intake for an aircraft engine.

Another object of the present invention is to provide a new and improved air intake which is effective for improving pressure recovery thereto.

Another object of the present invention is to provide a new and improved air inlet for a turboprop engine including passive means for improving pressure recovery to the air inlet.

An air inlet for an aircraft engine is disclosed. The inlet includes a nacelle and a fairing spaced therefrom for defining an inlet duct to the engine. The fairing includes a plurality of inlet apertures in flow communication with ambient air, and the nacelle includes at least one outlet aperture in flow communication with ambient air. A plurality of struts extends between the fairing and the nacelle, and a plurality of flow channels is provided, each extending in flow communication from respective ones of said inlet apertures through said struts and nacelle and to said outlet aperture. During operation, the air inlet receives air, and a portion thereof adjacent to the fairing is channeled through the inlet apertures and flow channels and out the outlet aperture into the ambient air flowing over the nacelle.

BRIEF DESCRIPTION OF THE DRAWING

The novel features believed characteristic of the invention are set forth in the claims. The invention, in accordance with preferred embodiments, together with further objects and advantages thereof, is more particularly described in the following detailed description taken in conjunction with the accompanying drawing in which:

DETAILED DESCRIPTION

Figure 1:
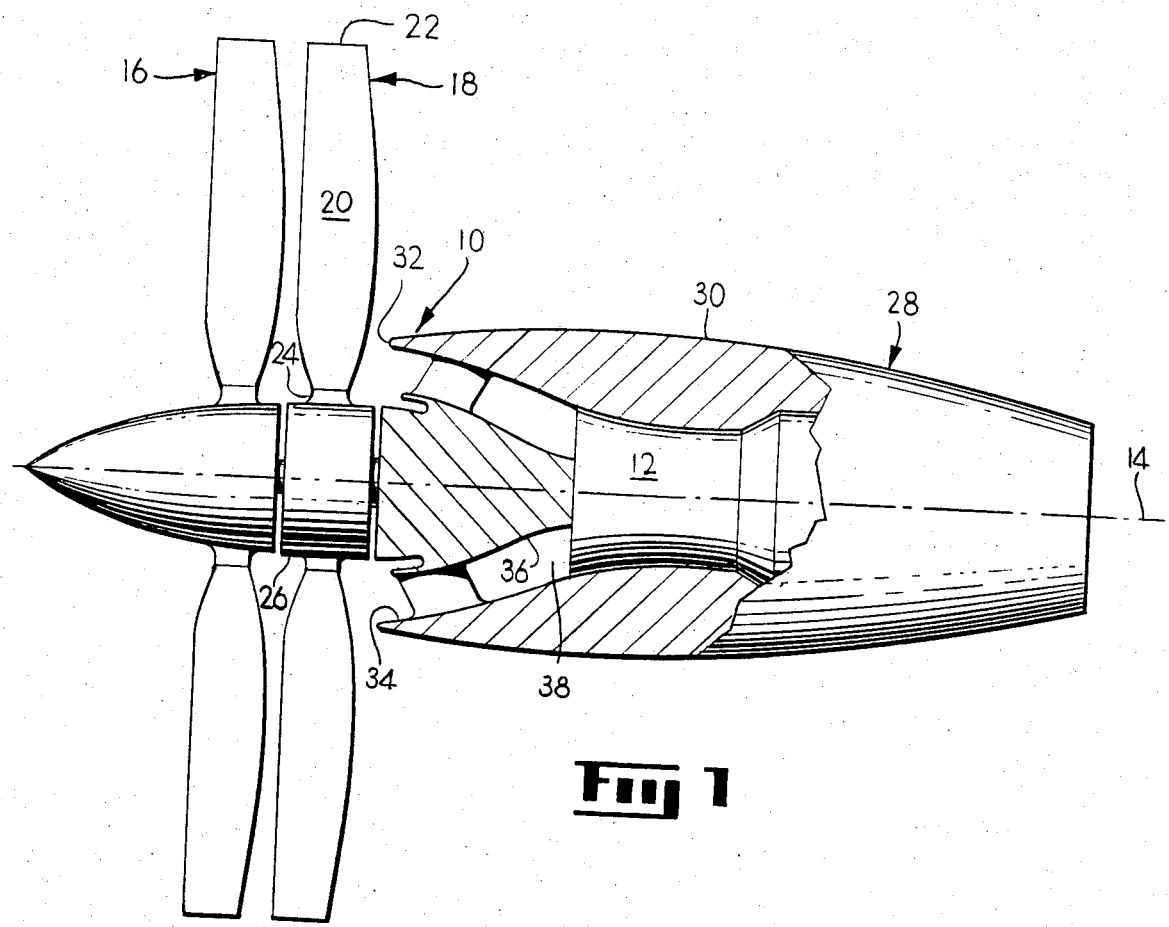
FIG. 1 is a sectional, partly schematic view of an exemplary aircraft engine including a pair of counter-rotating propeller blade rows disposed coaxially at an upstream end of a gas turbine engine and including an air inlet according to a preferred embodiment of the present invention.

Illustrated in FIG. 1 is an air inlet in accordance with an exemplary, preferred embodiment of the invention indicated generally at 10 for an otherwise conventional aircraft engine 12. The engine 12 may be a conventional gas turbine engine having a compressor, combustor and turbine, not shown, disposed coaxially along a centerline 14 with a pair of counter-rotating propeller blade rows: a forward blade row 16 and an aft blade row 18. Although two propeller rows are shown for providing improved aerodynamic performance of the propellers themselves, one propeller row may be utilized for the purposes of the present invention. Accordingly, only the aft propeller row 18 will be further described in detail, it being understood that the forward row 16 is substantially similar to the aft row 18. The propeller row 18 includes a plurality of circumferentially spaced propeller blades 20, each having a tip 22, and a root 24 attached to a propeller hub 26.

The engine 12 is suitably disposed in an annular nacelle 28 having an outer surface 30, over which flows ambient air including air being channeled through the propeller rows 16 and 18. The nacelle 28 also includes a leading edge 32 and an inner surface 34 extending therefrom and being spaced radially inwardly from the outer surface 30. Spaced radially inwardly from the nacelle inner surface 34 is an annular fairing 36 between which is defined an inlet duct 38 which channels a radially inner portion of air from the propeller rows 16 and 18 to the engine 12.

Figure 2:
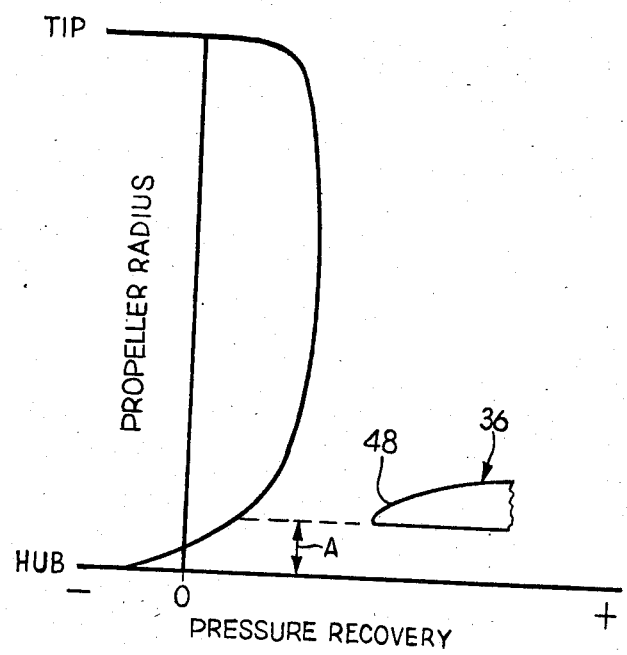
FIG. 2 is a plot illustrating pressure recovery with respect to propeller radius for the engine illustrated in FIG. 1.

Illustrated in FIG. 2 is a plot which represents pressure recovery (abscissa) as a function of the radius of the aft propeller 20 from the hub 26 to the propeller tip 22 (ordinate) and the relationship thereof with respect to the fairing 36, a portion of which is also illustrated. The graph illustrates that pressure recovery over the propeller blades 20 has a negative value near the hub 26 which increases to a positive value at a relatively short distance from the hub 26. The pressure recovery having negative or relatively low values is considered undesirable from an aerodynamic performance standard. To allow such air to enter into the inlet duct 38 would reduce the overall performance capability of the engine 12 and, therefore, is not desirable.

Figure 3:
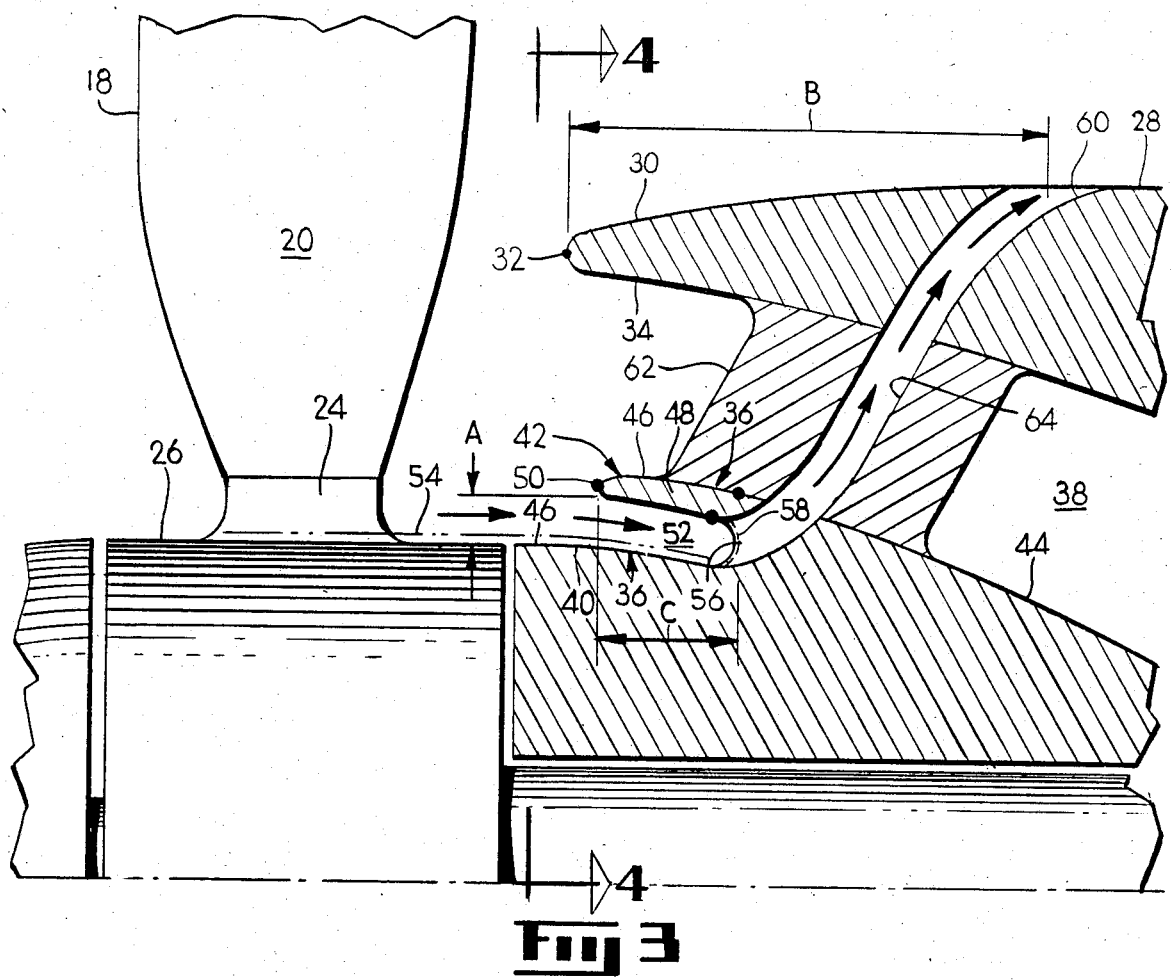
FIG. 3 is an enlarged sectional view of the air inlet illustrated in FIG. 1.

Illustrated in FIG. 3 is an enlarged view of the exemplary, preferred embodiment of the air inlet 10 illustrated in FIG. 1. The fairing 36 of the air inlet 10 includes a forward portion 40, which is aligned coextensively with the propeller hub 26; an intermediate portion 42; and an aft portion 44. The fairing 36 also includes an inner, flow boundary surface 46 extending from the forward portion 40, along the intermediate portion 42 and to the aft portion 44, over which air may flow.

In the preferred embodiment of the invention, the fairing intermediate portion 42 is shaped to define an airfoil-shaped or a leading edge section 48 having a leading edge 50. The leading edge section 48 faces in an upstream direction and is preferably spaced radially outwardly from the fairing forward portion 40 to define a generally U-shaped pocket 52, which may extend the entire annular perimeter of the fairing 36.

The purpose of the pocket 52 is to capture that undesirable portion of the airflow from the propellers 20 near the hub 26, which has undesirable pressure recovery, and divert such flow away from the inlet duct 38. Accordingly, and referring to both FIGS. 2 and 3, the leading edge section 48 may be spaced a predetermined distance A radially outwardly from the fairing forward portion 40 to capture at least that portion of the airflow from the propellers 20 having a negative value of pressure recovery. The fairing forward portion 40 upstream of the struts 62 (identified hereinbelow) is aligned coextensively with the hub 26 and has a substantially smooth inner surface 46 so that the pocket 52 may face forward for receiving air from the propellers 20 without obstruction.

Of course, the dimension A may be sized by those skilled in the art from the teachings herein to capture also a portion of the airflow having relatively low pressure recovery. Such sizing of the pocket 52 is relatively large to capture not only the relatively small boundary layer of air, indicated generally at 54 in FIG. 3, but also a portion of the air flowing at radial positions higher than the boundary layer 54 for improving the pressure recovery into the inlet duct 38 itself. If the air having relatively low values of pressure recovery is not diverted from the inlet duct 38, it will flow therein, thus reducing the potential performance which may be realizable from the engine 12.

Figure 4:
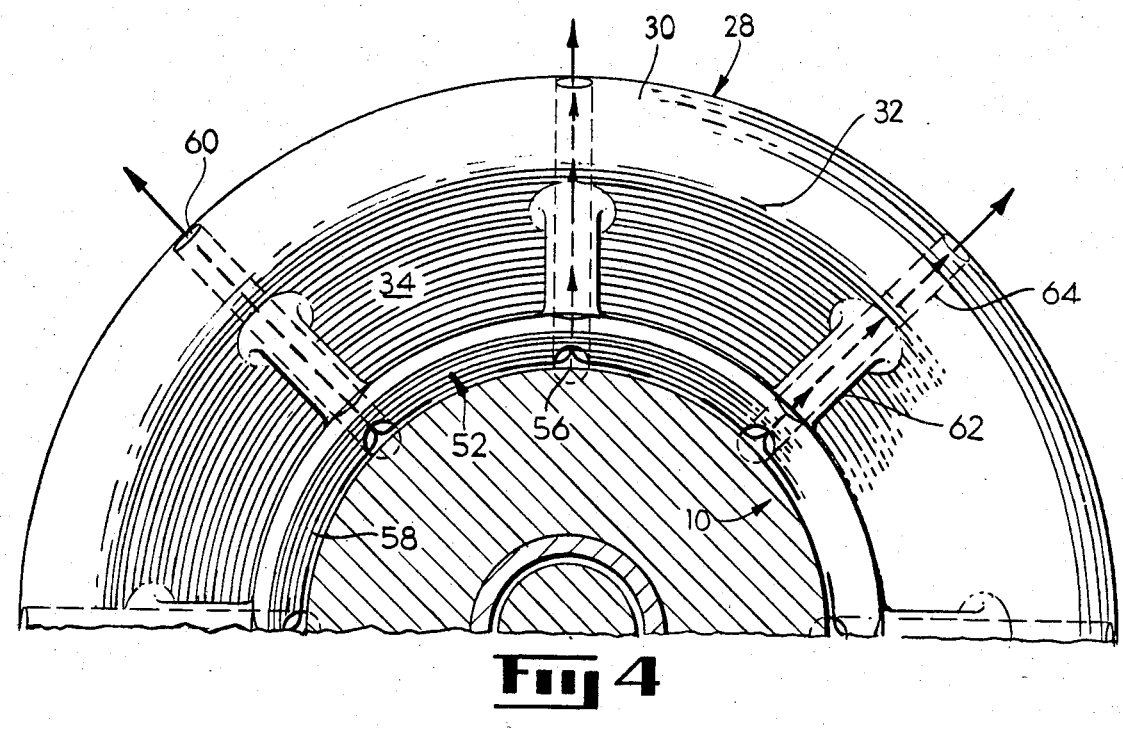
FIG. 4 is a sectional view of the air inlet of FIG. 1 taken along lines 4—4.

Referring to FIGS. 3 and 4, the air inlet 10 further includes a plurality of circumferentially spaced inlet apertures 56 disposed in that portion of the fairing inner surface 46 which defines a concave back wall 58 of the pocket 52. Furthermore, the relative axial length C measured from the fairing leading edge 50 to the back wall 58 of the pocket 52 may also be varied, which in combination with the dimension A of the pocket 52 may be utilized to affect the ram effect of air entering the pocket 52 and thus the amount of discharge through the inlet apertures 56.

In a preferred embodiment of the invention the nacelle 28 includes a plurality of circumferentially spaced outlet apertures 60 disposed in the outer surface 30 and in flow communication with ambient air. A plurality of circumferentially spaced, airfoil-shaped struts 62 extends from the fairing inner surface 46 to the nacelle inner surface 34 at forward ends thereof and at least partly downstream of the inlet apertures 56, and includes a respective plurality of flow ducts or channels 64 extending therein. Respective ones of the flow channels 64 extend from the inlet apertures 56 to the outlet apertures 60. Thus, air which enters the annular pocket 52 is channeled through the inlet apertures 56, the flow channels 64 extending through the struts 62 and the nacelle 28 and out the outlet apertures 60 to the atmosphere.

The specific contour of the nacelle outer surface 30 and placement of the outlet apertures 60 at a distance B from the leading edge 32 may be conventionally determined for obtaining a pressure at the outlet apertures 60 during flight of the aircraft which is lower than ambient air pressure over the nacelle 30, thus providing for an ejector action to enhance the discharge of the relatively low pressure recovery airflow channeled into the pocket 52. Just as an aircraft wing is conventionally designed to provide lift by causing a low pressure over its outer surface, the nacelle outer surface 30 may be similarly designed to provide such low pressure.

The preferred embodiment of the invention as illustrated in FIGS. 3 and 4 is entirely a passive device not requiring the use of power to affect the bleeding of the relatively low pressure recovery air from pocket 52.

Figure 5:
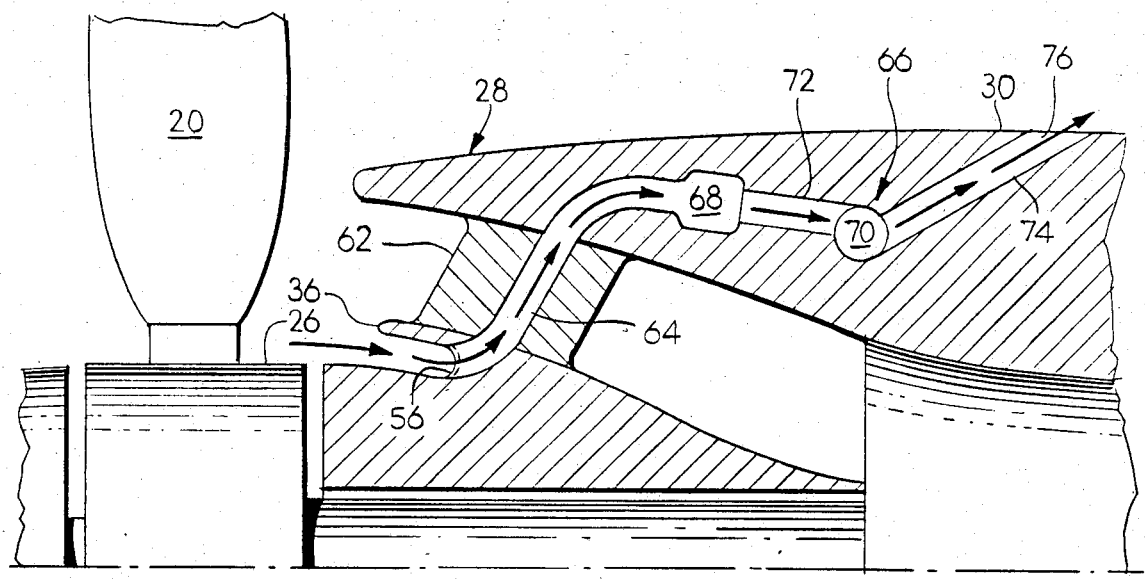
FIG. 5 is a sectional, partly schematic, illustration of an air inlet according to a second embodiment of the present invention.

Illustrated in FIG. 5 is an alternate embodiment of the invention including a blower means 66 to yet further enhance the bleeding of air from the propeller hub 26. This embodiment of the invention is substantially identical to the embodiment illustrated in FIGS. 3 and 4 except as follows. In particular, the blower means 66 includes an annular collection manifold 68 and the flow channels 64, which, instead of communicating directly with the outlet aperture 60 of the FIG. 3 embodiment of the invention, are disposed in flow communication with the manifold 68. The blower means 66 also includes a conventional air pump 70, for example, a powered fan, disposed in flow communication with the collection manifold 68 through a connection duct 72. The air pump 70 may be connected through a single discharge duct 74 to a single outlet aperture 76 disposed in the nacelle outer surface 30. A plurality of circumferentially spaced outlet apertures 60 is not needed for this embodiment of the invention, although arrangements might be possible where advantages may arise from their use.

Figure 6:
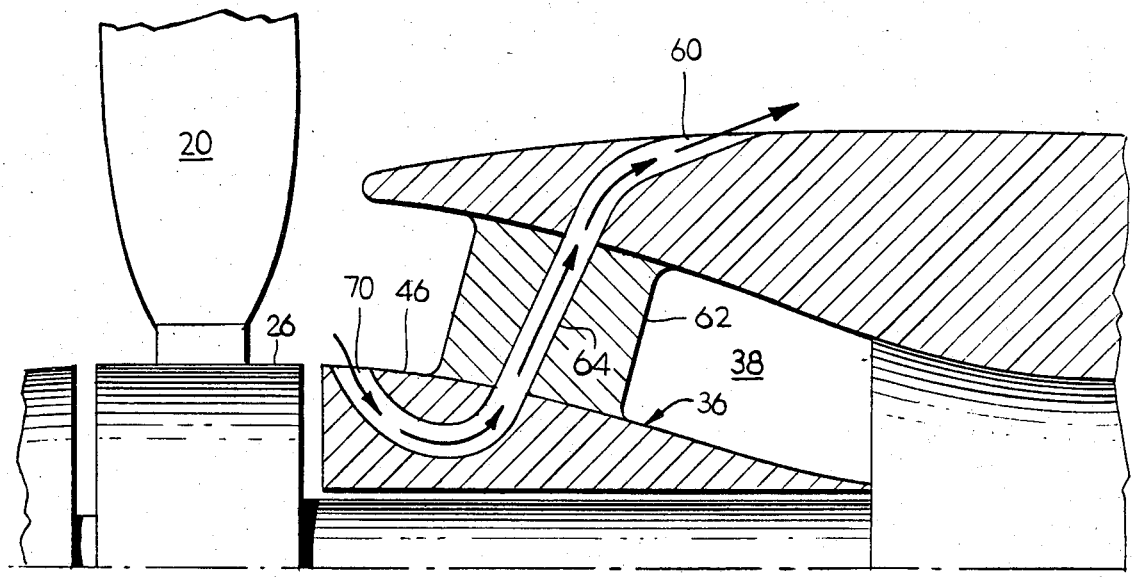
FIG. 6 is a sectional, partly schematic, view of an air inlet for a third embodiment of the present invention.

Illustrated in FIG. 6 is yet another embodiment of the invention. In this embodiment, a pocket 52 is not utilized; but, instead, a plurality of circumferentially spaced inlet apertures 70 is disposed in the fairing 36 upstream of the struts 62 and faces substantially only in a radially outward direction. The fairing surface 46 is substantially smooth and coextensive with the propeller hub 26 and thus does not include any inflections in surface which defined the pocket 52 in the FIG. 3 embodiment of the invention. In this embodiment, air flowing past the propellers 20 flows along a substantially straight line into the engine inlet duct 38. The flow channels 64 and outlet apertures 60 as described in the FIG. 3 embodiment of the invention are effectively utilized in this embodiment for providing an ejector action of the air flowing over the inlet aperture 70.

While there have been described herein what are considered to be preferred embodiments of the present invention, other modifications of the invention shall be apparent to those skilled in the art from the teachings herein, and it is, therefore, desired to secure in the appended claims all such modifications as fall within the true spirit and scope of the invention.

More specifically, and for example only, although the preferred embodiment includes the fairing 36, nacelle 30 and pocket 52, which are concentric and fully annular, the invention may be practiced for an air inlet which is not fully annular, and one which is not coaxial with the propeller blade rows.

Accordingly, what is desired to be secured by Letters Patent of the United States is the invention as recited in the following claims.

I claim:

1. An air inlet for an aircraft engine comprising:
   a nacelle for containing the engine having a leading edge, and including an outlet aperture in an outer surface thereof for being in flow communication with ambient air;
   a fairing spaced radially inwardly from said nacelle for defining an inlet duct therebetween for channeling air to the engine, said fairing including a plurality of circumferentially spaced inlet apertures in an inner surface thereof for being in flow communication with ambient air;
   a plurality of circumferentially spaced struts extending between forward ends of said fairing and said nacelle; and
   a plurality of flow channels, each extending in flow communication with a respective one of said inlet apertures, through said struts and nacelle and to said outlet aperture.

2. An air inlet according to claim 1 wherein said fairing comprises a forward portion and an intermediate portion spaced radially outwardly therefrom, said intermediate portion defining a leading edge section facing in an upstream direction, said leading edge section and said forward portion defining a generally U-shaped pocket therebetween opening in a forward direction, and said inlet apertures being disposed in said pocket.

3. An air inlet according to claim 2 wherein said fairing, nacelle and pocket are concentric and annular.

4. An air inlet according to claim 3 wherein said aircraft engine further includes a row of propeller blades extending from a propeller hub disposed upstream of said nacelle and fairing, said hub being coextensive with said fairing forward portion, and said leading edge section being predeterminedly spaced radially outwardly from said fairing forward portion for sizing said pocket for capturing both a boundary layer of air and a portion of airflow at radial positions higher than the boundary layer of air for improving pressure recovery in said inlet duct.

5. An air inlet according to claim 4 further including a plurality of circumferentially spaced ones of said outlet apertures, and wherein said nacelle is contoured and said outlet apertures are located downstream from a nacelle leading edge so that as ambient air flows over said nacelle the pressure at said outlet apertures is less than the pressure at said inlet apertures.

6. An air inlet according to claim 4 further including blower means operatively connected to said flow channels for drawing air through said inlet apertures and discharging said air out said outlet aperture.

7. An air inlet according to claim 6 wherein said blower means further comprises an annular collection manifold disposed in said nacelle and in flow communication with all said flow channels for collecting air therefrom, and an air pump in flow communication with said manifold and said outlet aperture.

8. An air inlet according to claim 1 wherein said fairing upstream of said strut has a substantially smooth inner surface.

9. An air inlet for an aircraft engine having a row of propeller blades extending from a propeller hub comprising:
   an annular nacelle having a leading edge and including a plurality of circumferentially spaced outlet apertures in an outer surface thereof for being in flow communication with ambient air;
   an annular fairing spaced radially inwardly from said nacelle for defining an annular inlet duct for channeling air to the engine, said fairing including a forward portion and an intermediate portion spaced radially outwardly therefrom, said intermediate portion defining a leading edge section facing in an upstream direction, said leading edge section and said forward portion defining therebetween a generally U-shaped pocket opening in a forward direction, and said fairing further including a plurality of circumferentially spaced inlet apertures disposed in said pocket for being in flow communication with ambient air;
   a plurality of circumferentially spaced struts extending between forward ends of said fairing and said nacelle; and
   a plurality of flow channels, each extending in flow communication from respective ones of said inlet apertures, through said struts, through said nacelle and to said outlet apertures.

10. An air inlet according to claim 9 wherein said nacelle is contoured and said outlet apertures are located downstream from said nacelle leading edge so that as ambient air flows over said nacelle the pressure at said outlet apertures is less than ambient pressure over said nacelle.

* * * * *